Oct. 5, 1937.                    W. G. DUNN                    2,094,917
WIND DRIVEN GENERATOR STRUCTURE
Filed April 12, 1937
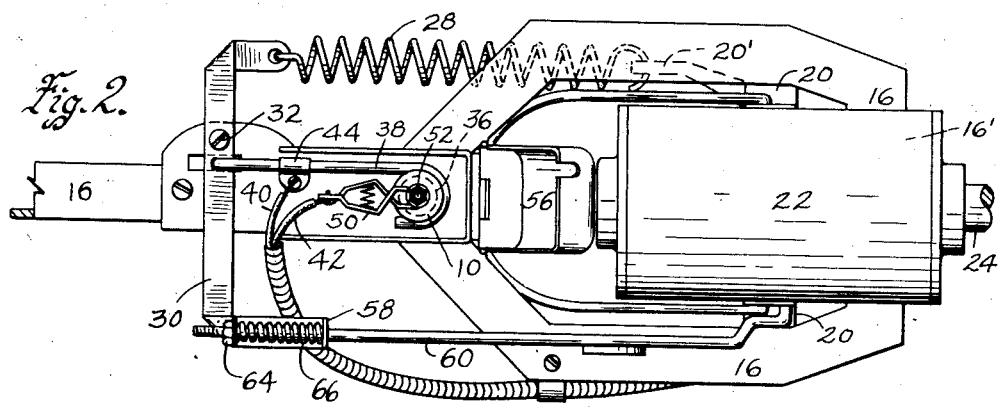
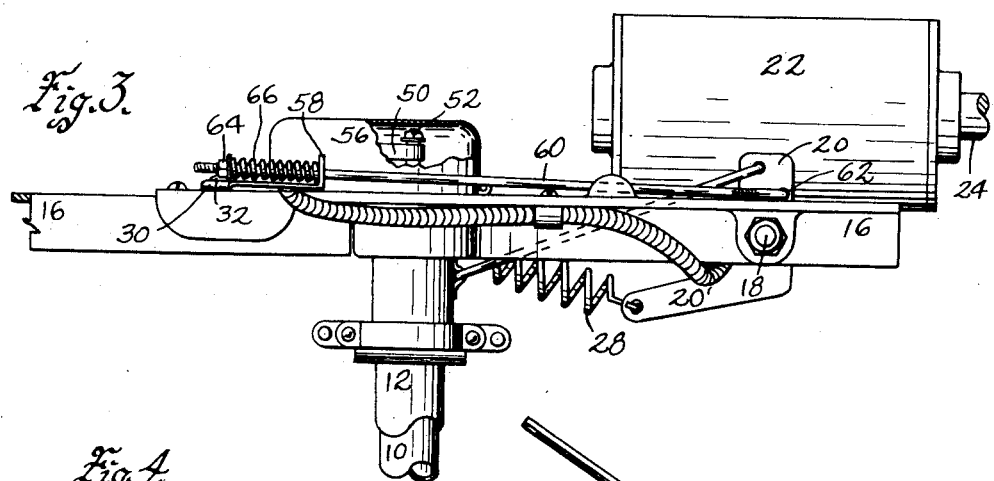
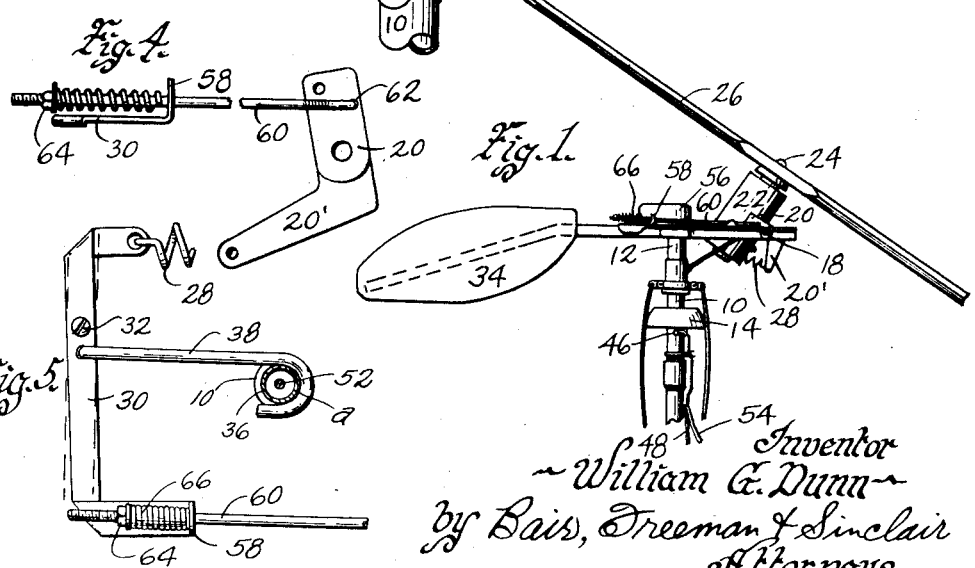
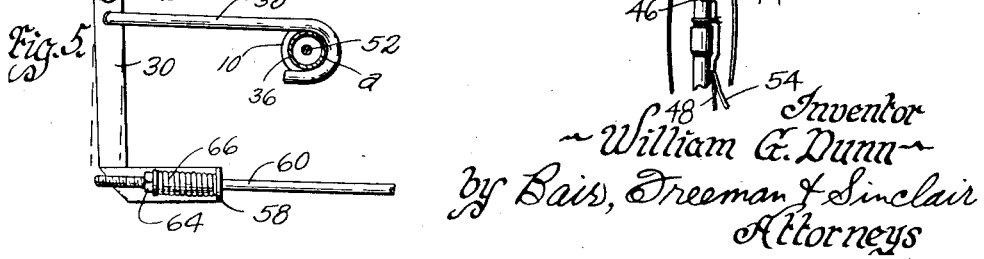
Inventor
William G. Dunn
by Bair, Freeman & Sinclair
Attorneys Patented Oct. 5, 1937

2,094,917

UNITED STATES PATENT OFFICE 2,094,917

WIND DRIVEN GENERATOR STRUCTURE

William G. Dunn, Clarinda, Iowa

Application April 12, 1937, Serial No. 136,425

19 Claims. (Cl. 290—55)

An object of my present invention is to provide a wind driven generator structure having improved features of construction over the generator disclosed in my Patent No. 2,052,816, issued September 1, 1936.

A further object is to provide in connection with a self-governing wind driven generator having means to counteract the gyroscopic action of the propeller, which action tends to rotate the entire structure about a vertical axis against the tendency of a vane acting to point the generator into the wind, a means to at least partially nullify the action of the gyroscopic counteracting means when the wind pressure or velocity falls to below a predetermined degree, thus facilitating movement of the wind driven generator to a position facing the wind when the wind pressure is below a predetermined velocity.

More particularly it is an object of my present invention to provide in connection with the type of generator shown in my former patent, a means to reduce the frictional engagement of a pair of elements thereof whenever a generator is in normal position, the generator being adapted for assuming a tipped back position in response to excessive wind pressure.

A further object is to provide in connection with a wind driven generator structure which rotates on a vertical axis, and wherein is provided an element which frictionally engages a support for the generator and tends to effect a reduction in the tendency of the structure to rotate about its vertical axis, a means to reduce or eliminate this frictional engagement when wind pressures are so low that it is not necessary and when it is, on the other hand, desirable to facilitate movement of the generator to a position facing the wind and therefore undesirable to have much friction opposing the movement of the generator to wind facing position.

A further object is to provide in connection with a propeller which tips backwardly due to wind pressure, against the action of a spring, and wherein frictional means is provided to discourage rotation of the entire structure on its vertical axis, a means to reduce the frictional effect during periods of low wind velocity, or to eliminate the frictional effect altogether if desired.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of my wind driven generator structure showing the generator in a tipped back position due to excessive wind pressure against the propeller thereof.

Figure 2 is an enlarged plan view of a portion of the structure.

Figure 3 is a side elevation enlarged relative to Figure 1 and showing the generator in non-tipped back position.

Figure 4 is a similar view of certain portions of Figure 3 showing the position of the parts assumed immediately after the generator commences to tip back as a result of excessive wind pressure; and Figure 5 is a view similar to a portion of Figure 2 showing a slightly modified construction.

On the accompanying drawing I have used the reference numeral 10 to indicate a support which is preferably made of pipe or other tubular material. The support 10 has rotatably mounted thereon a sleeve 12 limited against downward movement by a guard 14. The sleeve 12 is freely rotatable on the pipe 10 and supports a frame 16. The frame 16 supports a horizontal pivot pin 18 on which a generator cradle frame 20 is pivoted.

A generator 22 is secured to the frame 20 in any suitable manner. The generator 22 normally engages a front cross bar 16' of the frame 16 which acts as a stop therefor when the propeller shaft 24 of the generator is in a horizontal position. In Figure 1 a propeller 26 is illustrated as being mounted on the shaft 24. The frame 20 is urged into position with the generator 22 engaging the cross bar 16 by a spring 28 connected to an arm 20' of the frame 20. The other end of the spring 28 is connected to a lever 30 pivoted at 32 to the frame 20. A vane 34 is secured to the rear end of the frame 16 for the purpose of pointing the propeller 26 into the wind. The upper end of the support 10 is provided with an annular groove 36 in which the hook end of a rod 38 is seated. This rod has its opposite end pivoted to the lever 30 so that the spring 28 tends to cause the rod 38 to frictionally engage the support 10.

Current carrying wires 40 and 42 extend from the generator 22 and the wire 40 is electrically connected by a clamp 44 with the rod 38. Thus the rod frictionally engaging the groove 36 of the support 10 serves as a collector ring connection between the generator and the support.

The support is provided with a terminal bolt 46 below the guard 14, to which is connected a current supply wire 48. The other current carrying wire 42 has a yielding member such as a spring clamp 50 connected with its free end.

An insulated current conductor 52 extends down through the support 10 and is connected with a second current supply wire 54. The jaws of the spring clamp 50 frictionally engage around the insulated current conductor 52, to provide a second collector ring connection so that the current generated by the generator 22 is collected from the generator structure which can rotate on the support 10 to the wires 48 and 54 which are stationary.

The hook end of the rod 38 also serves as a means to limit upward thrust of the sleeve 12 relative to the support 10 and to thus retain the parts assembled.

I preferably provide a cover or guard 56 for the upper end of the support 10 which is pivotally mounted so that it can be swung back when it is desirable to perform any kind of operation or repair on the parts enclosed thereby. It is shown in its swung back position in Figure 2.

It will be noted that the spring 28 and the rod 38 are connected to the lever 30 on opposite sides of the pivot 32. The spring 28 is connected to one end of the lever. At the other end of the lever a perforated ear 58 is provided. A rod 60 extends loosely through the perforation thereof and has its forward end pivoted to the frame 20 by insertion into a perforation 62 thereof. An adjusting nut 64 is provided on the rod 60 between which and the ear 58 a light spring 66 is mounted.

The parts 58 to 66 particularly form the essence of the present invention.

In Figure 5 I show a slightly modified construction wherein the electrical contacts 44 and 50 are eliminated when such connections are provided in the form of brushes, such as those shown in my co-pending application, filed April 17, 1937, Serial Number 137,506, where it is not necessary to maintain frictional engagement for an electrical contact between the rod 38 and the pipe 10. The frictional engagement between these two elements may be entirely eliminated when the generator is in non-tipped back position. The parts shown in Figure 5 by solid lines occur in response to the generator assuming the non-tipped back position of Figure 3.

It will be noted that the arm 30 has been moved to such a position that the hook rod 38 is actually released from the groove 36 of the pipe 10. This can be accomplished by adjusting the nut 64 to such a position that the spring 66 is fully compressed, and thereby moves the ear 58 forwardly when the generator assumes non-tipped back position. The tipped back position of the generator results in the springs 28 again moving the arm 30 to the dotted position corresponding to the position shown in Figure 2, so that there is frictional engagement between the hook rod 38 and the pipe 10, to resist turning movement of the generator structure relative to the pipe as the generator assumes a tipped back position. Obviously when it is not necessary to use the rod 38 and the pipe 10 as an electrical connection, one can be released relative to the other in the non-tipped back position of the generator, so that free movement of the generator for purposes of facing it into the wind is secured to a maximum degree.

*Practical operation*

A wind driven generator structure constructed as disclosed has a number of advantages which are particularly desirable in connection with a self-governing wind generator. When the propeller is rotating and driving the generator structure, a torque or twisting force is applied to the generator housing which is held from rotation by being connected to the frame 20. When excessive wind pressure forces the propeller from a vertical to a horizontal position, the axis of the generator is changed inversely from the horizontal toward the vertical or parallel to the axis of the support 10. The axis of the generator now being parallel with the axis of the support, the entire mechanism is induced by the armature torque to turn the generator housing and therefore the entire head of the structure about the support 10. This causes an erratic performance of the machine in its self-governing capacity.

The spring 28 tends to maintain a good frictional engagement between the hook end of the rod 38 and the support 10, thus providing friction for reducing the tendency of the supporting frame to thus rotate about its vertical axis when the propeller 26 tips back, as shown in Figure 1 due to excessive wind pressure thereagainst.

By connecting the spring 28 with the arm 20' the spring serves the double purpose of counteracting the tendency of the propeller 26 to tip back, which is essential as such tipping back must be opposed, and also automatically increases the frictional engagement of the rod 38 with the support 10 in proportion to the degree of movement in a tipped back direction.

Because of the frictional engagement between the rod 38 and the support 10, these two parts provide an excellent electrical connection permitting relative movement between the generator structure and the support and accordingly I connect the wire 40 with the rod 38.

By providing the conductor 52 and the clamp 50 in the position illustrated with respect to the other parts, it is possible to greatly simplify the construction yet secure a support for the structure which can be modified in a great number of ways to permit installation under various circumstances as the fixed conductor connections terminate under the guard 14. The support below these terminals can be modified in any fashion found desirable and the current supply wires 48 and 54 supported in any feasible manner without interference with the support, as is sometimes found in connection with other types of support.

The spring 28 is under some initial tension as it is desirable to have the wind velocity assume a predetermined degree before any tipping back action occurs. Accordingly there is always a frictional engagement between the rod 38 and the support 10.

In the construction disclosed in my prior patent I have found that this is to some extent undesirable because the structure may be in a certain position as a result of a previous wind which died down and when the wind again comes up from another direction it takes a considerable force to act upon the vane 34 to swing the generator to the new direction.

I therefore provide the rod 60 and spring 66 to accomplish the purpose of reducing the frictional engagement between the rod 38 and the support 10 when the generator is in non-tipped back position. This is accomplished by the spring 66 working in opposition to the spring 28 but being of lighter weight and accordingly over-balanced by the spring 28. When the generator is in a non-tipped back position the spring 66 will be somewhat compressed, the degree of compression being adjustable by properly positioning the nut 64. The compression of the spring 66 reduces the frictional engagement between the rod 38 and the support 10 and may be adjusted by the nut 64. However, since the rod 38 is used as a collector ring, it is desirable to reduce the pressure but not relieve it altogether.

When the parts are in the position shown in Figures 2 and 3, the spring 66 is operative to reduce the frictional engagement so that the structure can be easily swung into the wind, even though the wind velocity is quite low. There will still be maintained sufficient friction, however, to provide a good electrical connection between the rod 28 and the support 10 to carry the current from the generator to the wire 54.

When the velocity of the wind increases above a predetermined degree, it will tip the generator back against the action of the spring 28 and the initial tipping movement will release the spring 66 as shown in Figure 4, after which the rod 60 will slide freely through the ear 58 and thus permit the spring 28 to act in its capacity of increasing the friction of the rod 38 on the support 10.

Thus the rod 60 and spring 66 serve the purpose of reducing the friction of the rod 38 on the support 10 when the wind velocity is lower than a predetermined degree. Yet this structure permits utilization of all the advantages set forth in my former patent.

With the nut 64 adjusted as in Figure 5, the frictional effect of the rod 38 relative to the pipe 10 is eliminated rather than reduced. This is desirable in a structure where the parts 38 and 10 are not used for an electrical connection, as in Figure 2, thus securing maximum freeness of movement of the generator about its vertical axis whenever the wind pressure is light enough not to tip the generator backwardly. The spring 66 in this modification, of course, could be eliminated, the nut 64 directly engaging the ear 58 if desired, the spring 66 merely acting as a shock absorber for the parts.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a wind driven generator structure, a support, a frame pivoted thereon for rotation thereabout in a horizontal plane, friction means opposing such rotation, a propeller driven generator pivoted on said frame for movement to a tipped back position upon excess wind pressure being applied thereagainst, resilient means opposing such movement, said resilient means being operatively connected with said friction means to increase the friction thereof upon movement of said propeller driven generator to a tipped back position and means to reduce the friction of said friction means against the action of said resilient means to maintain it at a predetermined degree when said generator is in non-tipped back position.

2. In a wind driven generator structure, a support, a frame pivoted thereon for rotation thereabout, friction means opposing such rotation, a propeller driven generator supported on said frame for movement to a tipped back position upon excess wind pressure being applied thereto and means to reduce the friction of said friction means when said generator is in non-tipped back position.

3. In a wind driven generator structure, a vertical support, a frame pivoted thereon for rotation thereabout in a horizontal plane, friction means opposing such rotation, a propeller driven generator pivoted on said frame for movement to a tipped back position upon excess wind pressure thereagainst, said propeller driven generator being operatively connected with said friction means to increase the friction thereof upon movement of said propeller driven generator to a tipped back position and to decrease the friction thereof upon said propeller driven generator assuming a non-tipped back position.

4. In a wind driven generator structure, a vertical support, a frame pivoted thereon for rotation thereabout in a horizontal plane, friction means opposing such rotation, a propeller driven generator pivoted on said frame for movement to a tipped back position upon excess wind pressure thereagainst, said propeller driven generator being operatively connected with said friction means to decrease the friction thereof upon said propeller driven generator assuming a non-tipped back position.

5. In a wind driven generator structure, a support, a frame pivoted thereon, an element frictionally engaging said support to reduce the tendency of said frame to pivot about said support, a propeller driven generator pivotally mounted on said frame and movable relative thereto to a tipped back position upon excessive wind pressure being applied against the propeller thereof, resilient means opposing such movement and operatively connected with said element to increase the engagement pressure thereof against said support in proportion to the movement of said propeller driven generator toward tipped back position, said generator being operatively connected with said element to increase the engagement pressure thereof against said support in proportion to the movement of said propeller driven generator toward tipped back position, said generator being operatively connected with said element to reduce the engagement pressure thereof against said support in opposition to said resilient means upon said propeller driven generator assuming a non-tipped back position.

6. In a wind driven generator structure, a vertical support, a frame pivoted thereon for rotation thereabout in a horizontal plane, an element frictionally engaging said support with predetermined pressure to reduce the tendency of said frame toward such rotation, a propeller driven generator pivotally mounted on said frame and movable to a tipped back position upon excessive wind pressure being applied to the propeller thereof, said propeller driven generator being operatively connected with said element to decrease the engagement pressure thereof against said support when said propeller driven generator is in non-tipped back position.

7. In a wind driven generator structure, a frame pivoted on a vertical axis, a vane for maintaining said frame in a predetermined position relative to the direction of the wind, a horizontal pivot pin supported by said frame, propeller shaft journalling means mounted on said pivot pin, a propeller shaft journalled therein and vertically spaced from said pin, a propeller mounted on said propeller shaft, friction means tending to prevent rotation of said frame on its vertical axis and means operable upon said propeller shaft assuming a vertical position to at least partially nullify the effect of said friction means.

8. In a wind driven generator structure, a support, a frame pivoted thereon for rotation thereabout, an element frictionally engaging said support with predetermined pressure when the wind exceeds a predetermined velocity for reducing the tendency of said frame to rotate relative to said support, a propeller driven generator mounted on said frame, a current carrying wire extending from said generator to said element, said support having an annular groove to receive said element, a current supply wire connected to said support and means operative by reduction of wind velocity to below said predetermined velocity to reduce the degree of frictional engagement of said element with said support.

9. In a wind driven generator structure, a support, a frame pivoted thereon for rotation thereabout, an element frictionally engaging said support with predetermined pressure to reduce the tendency of said frame to rotate, a propeller driven generator pivotally mounted on said frame for movement to a tipped back position upon excess wind pressure thereagainst, a current carrying wire extending from said generator to said element, a current supply wire connected with said support, said generator being operatively connected with said element to decrease said predetermined pressure of engagement of said element against said support upon movement of said propeller driven generator to a non-tipped back position.

10. In a wind driven generator structure, a support, a frame pivoted thereon, an element frictionally engaging said support with predetermined pressure to reduce the tendency of said frame to rotate about its pivotal connection, a propeller driven generator pivotally mounted on said frame for movement to a tipped back position upon excess wind pressure thereagainst, a current carrying wire extending from said generator to said element, a current supply wire connected with said support, resilient means opposing movement of said propeller driven generator to a tipped back position, said resilient means being operatively connected with said element to increase the engagement pressure thereof against said support to above said predetermined pressure upon movement of said propeller driven generator to a tipped back position and to decrease the engagement pressure thereof against said support upon movement of said propeller driven generator to a non-tipped back position.

11. In a wind driven generator, a support, a frame pivoted thereon for rotation thereabove, a frictional element to reduce the tendency of said frame to rotate, a propeller driven generator mounted on said frame, resilient means connected with said frictional element to cause frictional engagement thereof, a pair of current carrying wires extending from said generator, one of said wires being connected with said frictional element, a yielding member connected with the other of said wires, a current conductor supported by said support and insulated therefrom, said yielding member frictionally engaging said current conductor, current supply wires connected with said support and current conductor and means responsive to a lowering of the wind pressure to below a predetermined degree and operable to oppose said resilient means and thereby reduce the frictional engagement of said frictional element.

12. A wind driven generator structure comprising a frame mounted on a vertical pivot, a vane for maintaining said frame in desired position relative to the direction of the wind, a generator pivotally mounted on a horizontal axis on said frame, a propeller for driving said generator and having its axis of rotation vertically spaced from said horizontal axis, a spring tending to maintain said generator in position with said axis of rotation horizontal, an element frictionally operable to reduce the tendency of said frame to rotate on its vertical pivot, said spring being connected with said element to increase the frictional effect thereof upon movement of said propeller from position with said axis of rotation horizontal due to the pressure of wind thereagainst and a second spring operative to oppose the first spring when said axis of rotation is horizontal due to less than a predetermined wind pressure thereagainst.

13. In a wind driven generator structure, a frame pivoted on a vertical axis, a vane for maintaining said frame in a predetermined position relative to the direction of the wind, a horizontal pivot pin supported by said frame, propeller shaft journalling means mounted on said pivot pin, a propeller shaft journalled therein and vertically spaced from said pin, a propeller mounted on said propeller shaft, means tending to normally maintain said propeller in a vertical plane, a generator driven by said propeller shaft, adjustable friction means tending to prevent rotation of said frame on its vertical axis and means for interconnecting said adjustable friction means and said propeller shaft journalling means for increasing the friction on said adjustable friction means in proportion to the movement of said journalling means relative to said frame from position with said propeller in a vertical plane and for decreasing the friction of said adjustable friction means when said propeller is in a vertical plane.

14. In a wind driven generator structure, a support, a frame pivoted thereon for rotation, an element frictionally operable to reduce the tendency of said frame to rotate relative to said support, a propeller driven generator mounted on said frame, resilient means connected with said element to cause such frictional engagement, a current carrying wire extending from said generator to said element and means operable to decrease such frictional engagement but maintain it at a lesser degree when the wind velocity falls to below a predetermined degree.

15. In a wind driven generator structure, a support, a frame pivoted relative thereto, an element frictionally engaging said support to reduce the tendency of said frame to so rotate, a propeller driven generator mounted on said frame, a current carrying wire extending from said generator to said element and means responsive to a drop of wind velocity to below a predetermined degree and operable to reduce the frictional engagement of said element.

16. In a wind driven generator structure, a support, a frame pivoted thereon for rotation thereabout, friction means opposing such rotation, a propeller driven generator supported on said frame for movement to a tipped back position upon excess wind pressure being applied thereto and means to eliminate the friction of said friction means when said generator is in non-tipped back position.

17. In a wind driven generator structure, a vertical support, a frame pivoted thereon for rotation thereabout in a horizontal plane, friction means opposing such rotation, a propeller driven generator pivoted on said frame for movement to a tipped back position upon excess wind pressure thereagainst, said propeller driven generator being operatively connected with said friction means to eliminate the friction thereof upon said propeller driven generator assuming a non-tipped back position.

18. A wind driven generator structure comprising a frame pivotally mounted, a vane for maintaining said frame in a desired position with respect to the direction of the wind, a generator pivotally mounted on said frame, a propeller for driving said generator, a spring tending to maintain said generator in position with its axis of rotation horizontal, an element frictionally operable to eliminate the tendency of said frame to rotate about its pivot, said spring being connected with said element to increase the frictional effect thereof upon movement of said propeller in response to the pressure of the wind exceeding a predetermined degree and a second spring operable to oppose the first spring when the wind velocity drops below said predetermined degree.

19. A wind driven generator structure comprising a frame pivotally mounted, a vane for maintaining said frame in a desired position with respect to the direction of the wind, a generator pivotally mounted on said frame, a propeller for driving said generator, a spring tending to maintain said generator in position with its axis of rotation horizontal, an element frictionally operable to reduce the tendency of said frame to rotate about its pivot, said spring being connected with said element to increase the frictional effect thereof upon movement of said propeller in response to the pressure of the wind exceeding a predetermined degree and a second spring operable to oppose the first spring when the wind velocity drops to below said predetermined degree.

WILLIAM G. DUNN.